United States Patent
Brosinger et al.

(10) Patent No.: US 9,995,451 B2
(45) Date of Patent: Jun. 12, 2018

(54) LIGHTING DEVICE WITH A LIGHT CONDUCTOR FOR A MOTOR VEHICLE EXTERIOR LIGHTING SYSTEM

(71) Applicants: AUDI AG, Ingolstadt (DE); HELLA KGAA HUECK & CO., Lippstadt (DE)

(72) Inventors: Manuel Brosinger, Gaimersheim (DE); Linda Alpmann, Ingolstadt (DE); Sebastian Stumpe, Ingolstadt (DE); Christoph Geister, Lippstadt (DE); Heinrich Schäfer, Bad Wünnenberg (DE); Carmen Bungenstock, Kleinenberg (DE); Martin Mügge, Geseke (DE)

(73) Assignees: AUDI AG, Ingolstadt (DE); Hella KGaA Hueck & Co., Lippstadt (DE)

( * ) Notice: Subject to any disclaimer, the term of this patent is extended or adjusted under 35 U.S.C. 154(b) by 0 days. days.

(21) Appl. No.: 15/104,513

(22) PCT Filed: Dec. 10, 2014

(86) PCT No.: PCT/EP2014/003297
§ 371 (c)(1),
(2) Date: Jun. 14, 2016

(87) PCT Pub. No.: WO2015/090535
PCT Pub. Date: Jun. 25, 2015

(65) Prior Publication Data
US 2016/0312973 A1    Oct. 27, 2016

(30) Foreign Application Priority Data

Dec. 18, 2013   (DE) .................. 10 2013 021 086

(51) Int. Cl.
  *F21V 9/00*     (2018.01)
  *B60Q 1/26*     (2006.01)
  *B60Q 1/34*     (2006.01)

(52) U.S. Cl.
  CPC ............ *F21S 43/26* (2018.01); *B60Q 1/2607* (2013.01); *B60Q 1/34* (2013.01); *F21S 43/14* (2018.01);
  (Continued)

(58) Field of Classification Search
  CPC ... B60Q 1/38; B60Q 1/50; B60Q 3/62; B60Q 3/80
  (Continued)

(56) References Cited

U.S. PATENT DOCUMENTS 5,165,774 A  * 11/1992  Windross ............... B60Q 1/26
                                                       362/511
6,637,917 B2   10/2003  Schwanz et al.
(Continued)

FOREIGN PATENT DOCUMENTS

CN    102644861 A    8/2012
CN    103261781 A    8/2013
(Continued)

*Primary Examiner* — William Carter
(74) *Attorney, Agent, or Firm* — Seed IP Law Group LLP

(57) ABSTRACT

The invention relates to a lighting device (10) according to the invention for a motor vehicle external light having a light conductor (12), which extends along a longitudinal extension direction (14) and has two end faces (16, 18), at least one first light source (20) for coupling light into one of the two end faces (16, 18) of the light conductor (12), a plurality of second light sources (22) for coupling light into the light conductor (12) vertically with respect to the longitudinal extension direction (14) of the light conductor (12), and a (Continued)

control unit for separate actuation of the at least one first light source (20) and of the plurality of second light sources (22).

9 Claims, 4 Drawing Sheets

(52) U.S. Cl.
CPC ........... *F21S 43/237* (2018.01); *F21S 43/245* (2018.01); *F21S 43/249* (2018.01); *B60Q 2400/20* (2013.01)

(58) Field of Classification Search
USPC .......................................................... 362/511
See application file for complete search history.

(56) References Cited

U.S. PATENT DOCUMENTS

| 2012/0212931 A1* | 8/2012 | Kinoshita | ............ G02B 6/0003 362/84 |
|---|---|---|---|
| 2013/0127340 A1 | 5/2013 | Huhn et al. | |
| 2013/0127612 A1 | 5/2013 | Stadler et al. | |
| 2013/0223089 A1 | 8/2013 | Danner et al. | |
| 2014/0003071 A1 | 1/2014 | de Lamberterie et al. | |
| 2014/0140088 A1* | 5/2014 | Griebel | ................... B60Q 1/38 362/555 |
| 2015/0330593 A1 | 11/2015 | Larsen et al. | |

FOREIGN PATENT DOCUMENTS

| DE | 200 20 544 U1 | 5/2001 |
|---|---|---|
| DE | 10 2005 019 018 A1 | 10/2006 |
| DE | 10 2009 058 457 A1 | 6/2011 |
| DE | 10 2010 025 208 A1 | 12/2011 |
| DE | 20 2012 100 148 U1 | 4/2012 |
| EP | 1 195 296 A2 | 4/2002 |
| EP | 1 835 224 A1 | 9/2007 |
| EP | 2 384 934 A1 | 11/2011 |
| JP | 2012-248358 A | 12/2012 |
| WO | 2010/097185 A1 | 9/2010 |
| WO | 2015/002013 A1 | 1/2015 |

* cited by examiner

US 9,995,451 B2

LIGHTING DEVICE WITH A LIGHT CONDUCTOR FOR A MOTOR VEHICLE EXTERIOR LIGHTING SYSTEM

The present invention relates to a lighting device for a motor vehicle exterior light. Furthermore, the present invention relates to a motor vehicle having such a lighting device. Finally, the invention relates to a method for operating a lighting device for a motor vehicle exterior light.

In modern motor vehicles, dynamic light functions can be provided with lighting devices, which are arranged, for example, in the headlights and/or taillights. For example, turn signals are known from the applicant, with which a swirling flash function can be created. To create this effect, individual light sources or illuminating surfaces are switched on one after the other, whereby a swirling flash function results. Furthermore, headlights are known in which the daytime running lights and the turn signal lights are operated via the same optics. To this end, a light conductor can be provided, into which, for example, light of differing color is fed with two light sources.

The animated light functions and the actual light function have different requirements. A flashing light or even a daytime running light must transmit the light precisely in a certain direction in order to fulfill the statutory values. The swirling elements, on the other hand, should emit homogeneously in all directions to the extent possible so that it is noticeable to the observer and meets the aesthetic demands. Currently, there is also no option for providing the swirling function for the headlights in a small installation space. Furthermore, there are no homogeneous illuminating shapes now with which completely illuminated segments and additionally a homogeneously illuminated daylight running light and flashing light can be provided.

In this context, DE 10 2009 058 457 A1 describes a motor vehicle lighting device with a light conductor and at least one first light source, which generates light of a first color and feeds it into the light conductor, as well as with at least one second light source, which generates light of a second color and feeds it into the light conductor, wherein the light conductor has light extraction elements and a light emission surface area. The light function of the daylight running lights and of the flashing light can be provided with the motor vehicle lighting mechanism. In addition, the first and the second light sources can be switched on alternatively with respect to one another.

In addition, DE 10 2005 019 018 A1 describes a light with at least one light conductor and multiple light sources. The light conductor has light ingress surfaces spaced apart from one another for light being emitted from the light sources, and light-emitting surfaces. The light sources can each emit light in a predetermined color. Thus, it is possible to couple in light of differing color into a single light conductor and to then extract the light again into specified preferential directions.

Furthermore, DE 10 2009 010 507 A1 describes a lighting device for a motor vehicle having at least one first illuminant and a light conductor, wherein at least one end face of the light conductor serves as a light coupling surface for the first illuminant and wherein a light-emitting surface is provided transversely with respect to a longitudinal axis of the light conductor at which the light beams are extracted. The lighting device can provide both a flashing light function as well as a daylight running lights function.

The present invention serves to indicate a way of providing different light functions of a lighting device for a motor vehicle external light so as to particularly save installation space.

This is achieved by a lighting device with the features of claim 1 and by a method with the features of claim 9. The dependent claims include further advantageous embodiments of the present invention.

The lighting device according to the present invention for a motor vehicle external light comprises a light conductor, which extends along a longitudinal extension direction and has two end faces, at least one first light source for coupling light into one of the two end faces of the light conductor, a plurality of second light sources for coupling light into the light conductor vertically with respect to the longitudinal extension direction of the light conductor, and a control unit for separate actuation of the at least first light source and of the plurality of second light sources.

The lighting device comprises a light conductor, which extends along a predetermined extension direction. The light conductor may have a predetermined curve. The light conductor may be produced, for example, from glass or plastic. Light may be coupled into one end face of the light conductor using a first light source. In doing so, two first light sources may be provided with which light of differing color can be coupled into one end face of the light conductor. Furthermore, the lighting device comprises a plurality of second light sources. Using the second light sources, light may be coupled into the light conductor vertically with respect to the longitudinal extension direction of the light conductor. The light of the second light sources may be coupled into the light conductor via an external surface or jacket surface of the light conductor. The at least one first light source and the second light sources may be actuated independently from one another with a control unit, i.e. switched on and off.

The lighting device may be used, for example, for a turn signal and/or daylight running lights of a headlight and/or taillights of a motor vehicle. A dynamic light function can be provided using the plurality of second light sources. For example, a swirling optical effect can be generated when the second light sources are switched on in sequence. Because of the fact that the light is coupled in vertically with respect to the extension direction of the light conductor with the second light sources, this results in a homogeneous appearance for the observer. The light function of the turn signal and/or the daylight running lights is created due to the at least one first light source. The focus in this case is on a targeted illumination in order to fulfill the statutory requirements. A clever structural arrangement can be provided that combines the separated lighting units and they, thus, appear as one unit with the lighting device comprising at least one first light source and a plurality of second light sources.

Preferably, an optical coupling element is arranged between each light source of the plurality of second light sources and the light conductor for coupling the light of the plurality of second light sources into the light conductor. The optical coupling element may be produced, for example, from glass or plastic. Each of the second light sources couples light into the optical coupling element allocated to it. The light is coupled into the light conductor via the optical coupling element. Thus, selectively different areas of a light conductor can be illuminated with the respectively second light sources.

In another embodiment, the optical coupling elements make contact with the light conductor. In particular, the optical coupling elements are arranged with respect to the light conductor such that there is no air gap between the optical coupling elements and the light conductor. Thus, the light of the second light sources can be coupled into the light conductor in a particularly effective way.

In one embodiment, the optical coupling elements each extend straight from one of the plurality of second light sources to the light conductor. Such type of optical coupling elements, which may have, for example, the shape of a cuboid or a cylinder, can be produced simply and economically.

In another embodiment, the optical coupling elements have a predetermined curve. Thus, an arrangement of the second light sources, the optical coupling elements, and the light conductor can be achieved that particularly saves on installation space.

In another embodiment, the optical coupling elements surround the light conductor, at least in areas. This way, the optical coupling elements may make contact with the light conductor in two or more areas that are different from one another. Thus, the light from the second light sources can be particularly homogeneously coupled into the light conductor.

In an alternative embodiment, the optical coupling elements and the light conductor are formed as a single piece. In this case, the optical coupling elements and the light conductor may be produced from the same material. For example, the optical coupling elements and the light conductor are produced as a single piece by means of an injection molding process. Thus, an economical production of the lighting device can be enabled.

The motor vehicle according to the present invention comprises the lighting device according to the present invention, wherein the lighting device is arranged in the headlights and/or the taillights of the motor vehicle. A daytime running light and/or a turn signal can be provided with the lighting device by operation of the at least one first lighting source. Through the corresponding actuation of the plurality of second light sources, a dynamic light function, such as a swirling turn signal, can be provided.

The method according to the present invention for operating a lighting device for a motor vehicle external light comprises provision of a light conductor, which extends along a longitudinal extension direction and has two end faces, coupling of light of at least one first light source into one of the two end faces of the light conductor, coupling of light with a plurality of second light sources into the light conductor vertically with respect to the longitudinal extension direction of the light conductor, and separate actuation of the at least one light source and of the plurality of second light sources with a control unit.

Preferably, initially the plurality of second light sources are switched on in sequence along the longitudinal extension direction of the light conductor, subsequently, the plurality of light sources are switched off, and then the first light source is switched on again. Thus, a swirling turn signal can be provided with which, on the one hand, a homogeneous radiation is achieved by activating the second light sources and, on the other hand, the statutory requirements are met with respect to emission by the activation of the at least one first light source.

The advantages and further embodiments described above in connection with the lighting device according to the present invention apply mutatis mutandis to the motor vehicle according to the present invention and the method according to the present invention.

The present invention is explained in more detail in the following using the accompanying drawings. The following is shown:

The exemplary embodiments explained in greater detail in the following represent preferred embodiments of the present invention.

Figure 1:
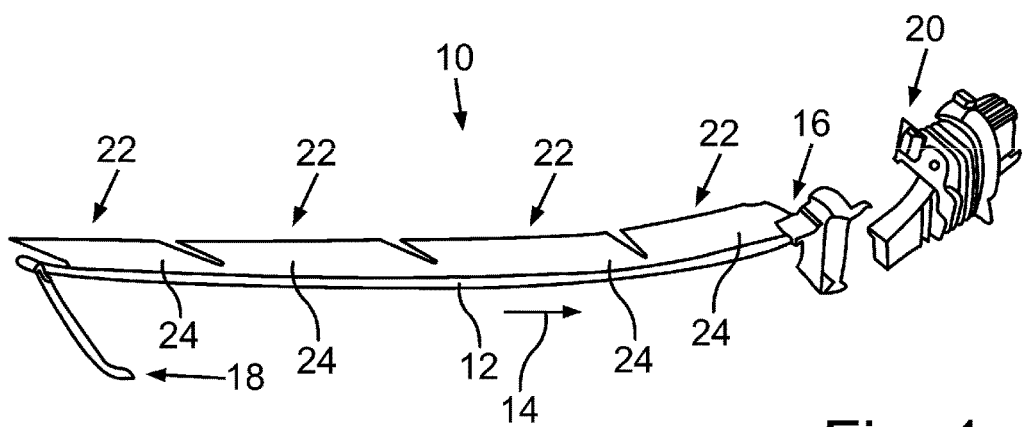
FIG. 1 shows a perspective view of a lighting device for a motor vehicle external light.

FIG. 1 shows a perspective view of a lighting device 10 for a motor vehicle external light. The lighting device 10 may be used, for example, in the headlights and/or the taillights of a motor vehicle. The lighting device 10 comprises a light conductor 12, which may be produced, for example, from glass or from plastic. The light conductor 12 extends along its longitudinal extension direction 14. The light conductor 12 has a first end face 16 and a second end face 18. In addition, the lighting device 10 comprises a first light source 20, with which light can be coupled into the first end face 16. A corresponding reflector element may be arranged at the second end face 18 for reflecting the light. In this case, two first light sources 20 may be provided with which light of a differing color can be coupled into the first end face 16 of the light conductor 12. For example, white light as well as yellow light can be coupled into the light conductor 12 with two first light sources 20.

Furthermore, the lighting device 10 comprises a plurality of second light sources 22. In the present exemplary embodiment, the lighting device 10 comprises four second light sources 22. One optical coupling element 24 is arranged between the second light sources 22 and the light conductor 12. Light may be coupled into the light conductor vertically with respect to the longitudinal extension direction 14 of the light conductor 12 with the second light sources 22 via the optical coupling elements 24.

Figure 2:
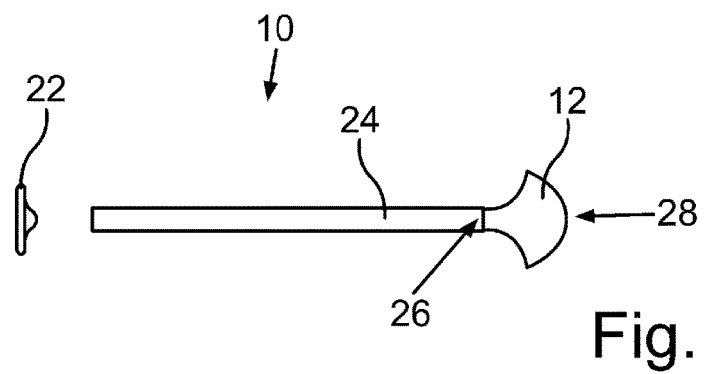
FIG. 2 shows a side cross-sectional view of the lighting device of FIG. 1.

FIG. 2 shows a side cross-sectional view of the lighting device 10 of FIG. 1. It is obvious that the optical coupling elements 24 are in direct contact with the light conductor 12. In the present exemplary embodiment, the light conductor 12 has a light coupling surface 26. The light ingress surface 26 of the light conductor 12 is in direct contact with the optical coupling element 24. Thus, the light of the second light source 22 can be particularly effectively coupled into the light conductor 12 via the optical coupling element 24. Furthermore, the light conductor 12 has a light-emitting surface 28 at which the light from the light conductor 12 can be emitted toward the exterior.

Figure 3:
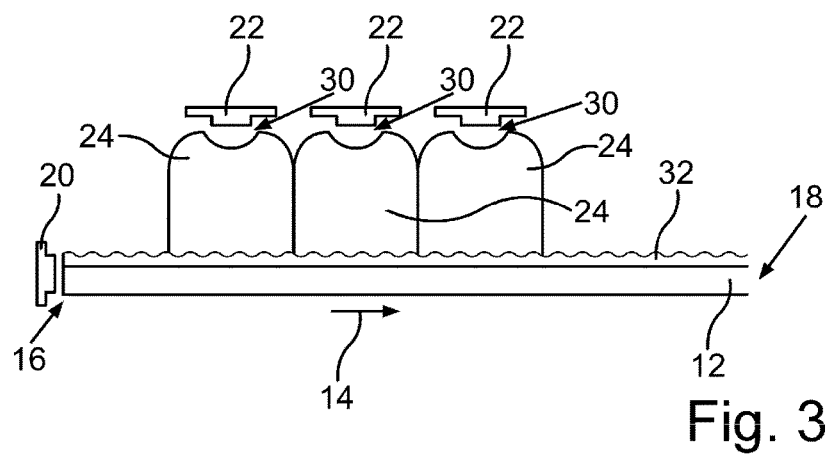
FIG. 3 shows a top view of another embodiment of a lighting device.

FIG. 3 shows a top view of another embodiment of a lighting device 10. The optical coupling elements 24 each have a recess 30, which facilitates the light of the second light sources 22 being coupled into the respective optical coupling elements 24. Furthermore, a connecting element 32 is arranged between the optical coupling element 24 and the light conductor 12. The contact between the optical coupling elements 24 and the light conductor 12 can be established through said connecting element 32. The connecting element 32 can be provided, for example, through an adhesive or a suitable plastic material.

Figure 4:
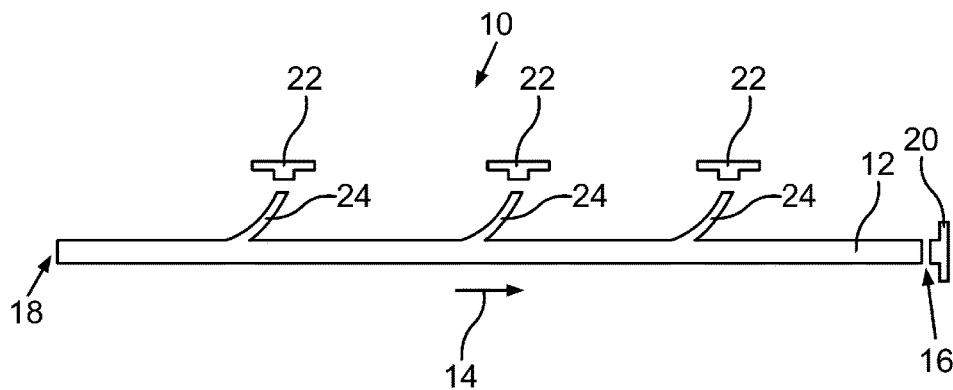
FIG. 4 shows a lighting device, in which optical coupling elements and a light conductor are configured as a single piece.
Figure 5:
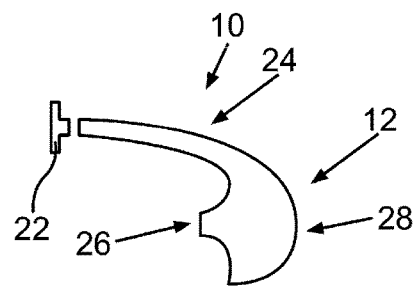
FIG. 5 shows a side cross-sectional view of the lighting device of FIG. 4.

FIG. 4 shows a top view of another embodiment of a lighting device 10 for a motor vehicle external light. Herein, the optical coupling elements 24 have a predetermined curve. In addition, the optical coupling elements 24 and the light conductor 12 are configured as a single piece. This can be seen particularly in FIG. 5, which shows a side cross-sectional view of the lighting device 10 of FIG. 4. Optical coupling elements 24 and the light conductor 12 can be produced, for example, from plastic and configured as a single piece by means of an injection molding process.

Figure 6:
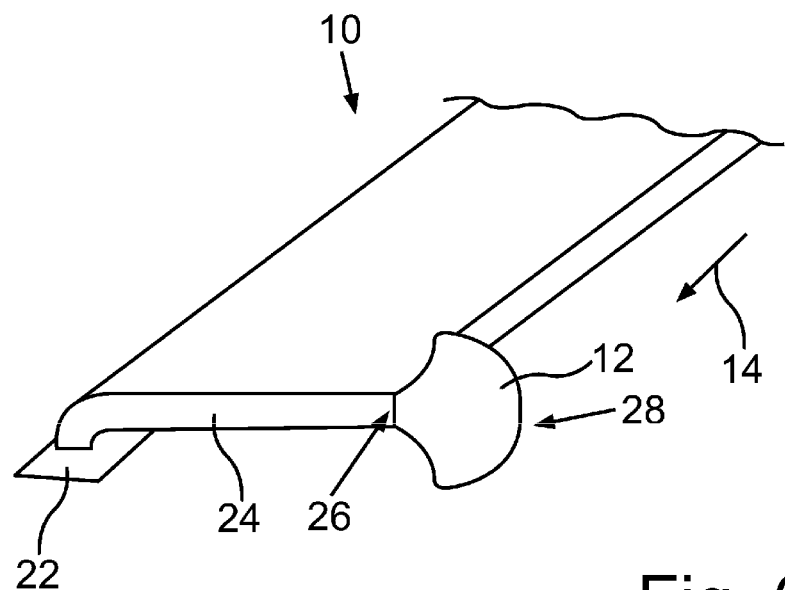
FIG. 6 shows a lighting device, in which the optical coupling elements have a predetermined curve.

FIG. 6 shows a perspective view of another embodiment of a lighting device 10. In the present exemplary embodiment, the optical coupling element 24 is in contact with the light ingress surface 26 of the light conductor 12. Thus, an arrangement of the lighting device 10 can be enabled that is particularly saving on installation space.

Figure 7:
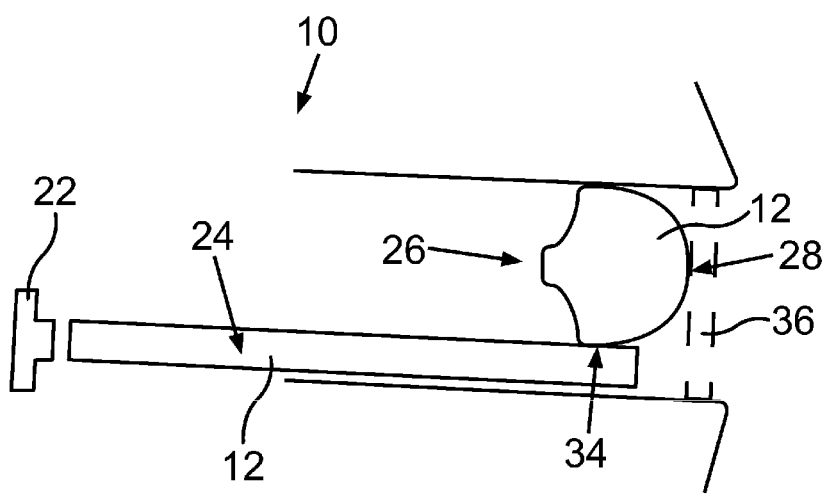
FIG. 7 shows a lighting device, in which the optical coupling elements are arranged below the light conductor.

FIG. 7 shows a side cross-sectional view of another embodiment of a lighting device 10 for a motor vehicle external light. Herein, the optical coupling element 24 is configured straight. The optical coupling element 24 is in contact with the light conductor 12 at a bottom surface 34 of the light conductor 12. In addition, the lighting device 10 comprises a booster disk 36, which is arranged in front of the emission surface 28 of the light conductor 12. The booster disk 36 may be removable. A light-permeable cover may be provided by the booster disk 36 as an attachment.

Figure 8:
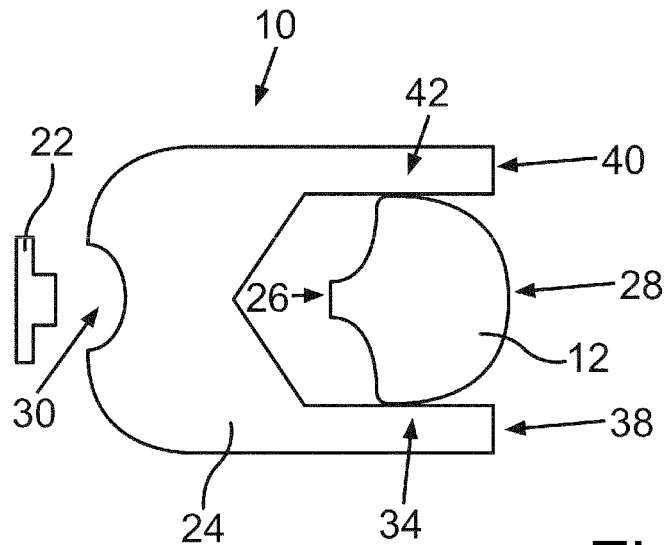
FIG. 8 shows a lighting device, in which the optical coupling elements are configured as a frame.

FIG. 8 shows a side cross-sectional view of another embodiment of a lighting device 10. Herein, the optical coupling element 24 is configured in the shape of a frame. The optical coupling element 24 surrounds the light conductor 12 at least in areas. A lower leg 38 of the optical coupling element 24 is in contact with the lower area 34 of the light conductor 12 and an upper leg 40 is in contact with the upper area 42 of the light conductor 12. Thus, the light conductor 12 can be clamped into the frame-shaped optical coupling element 24.

Figure 9:
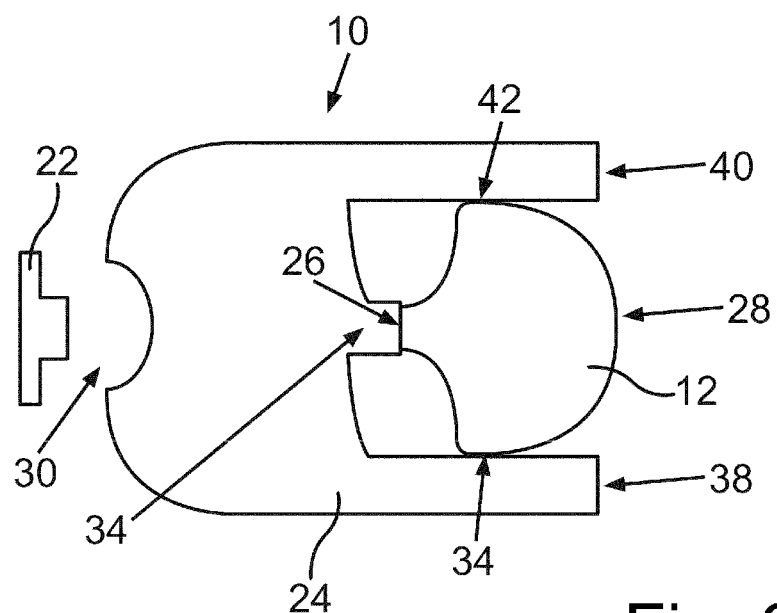
FIG. 9 shows a lighting device with frame-shaped optical coupling elements in another embodiment.

FIG. 9 shows a side cross-sectional view of another embodiment of a lighting device 10. Herein, the optical coupling element 24 is configured in the shape of a frame as in the exemplary embodiment of FIG. 8. In addition, the optical coupling element 24 has a middle bar 44, which is in contact with the light ingress surface 26 of the light conductor 12.

The lighting device 10 may be used in the headlights and/or the taillights of a motor vehicle. In doing so, the functionality of daylight running lights as well as a turn signal can be provided with the lighting device 10. In order to provide a daylight running light, light can be continuously coupled into the light conductor 12 with the first light source 20. In doing so, white light, for example, can be coupled into the light conductor 12 with the first light source 20. If the functionality of a turn signal is to be provided, the second light sources 22 can be switched on along the extension direction 14 of the light conductor 12 in sequence with a control unit, which is not shown here. Subsequently, the second light sources 22 can be switched off and the first light source 20 switched on. Thus, the functionality of a swirling turn signal can be provided.

The invention claimed is:

1. A lighting device for a motor vehicle exterior light, comprising:
   a light conductor, which extends along a longitudinal extension direction and has two end faces;
   at least one first light source for coupling light into one of the two end faces of the light conductor;
   a plurality of second light sources for coupling light into the light conductor vertically with respect to the longitudinal extension direction of the light conductor;
   a plurality of optical coupling elements, each optical coupling element comprising a single, unitary structure arranged between a respective one of the plurality of second light sources and the light conductor for coupling the light of the plurality of second light sources into the light conductor directly through material of the optical coupling elements; and
   a control unit for separate activation of the at least one first light source and the plurality of second light sources,
   wherein each of the optical coupling elements at least partially surrounds the light conductor to contact both a respective lower area and a respective upper area of the light conductor to pass light directly through the material of the optical coupling element and into the respective lower area and the respective upper area, and
   wherein the control unit is designed for providing a functionality of a turn signal indicator in order to switch on the plurality of second light sources along the longitudinal extension direction of the light conductor in sequence, subsequently switch off the plurality of second light sources and, subsequently switch on the first light source.

2. The lighting device according to claim 1, wherein each optical coupling element is in direct contact with the light conductor at the respective lower area and the respective upper area.

3. The lighting device according to claim 1, wherein each of the optical coupling elements includes a lower leg portion and an upper leg portion, which each extend straight past a rearmost portion of the light conductor.

4. The lighting device according to claim 1, wherein a portion of each of the optical coupling elements has a predetermined curve.

5. A motor vehicle, comprising:
   a lighting device that includes:
      a light conductor, which extends along a longitudinal extension direction and has two end faces;
      at least one first light source to couple light into one of the two end faces of the light conductor;
      a plurality of second light sources to couple light into the light conductor vertically with respect to the longitudinal extension direction of the light conductor;
      a plurality of optical coupling elements, each optical coupling element comprising a single, unitary structure arranged between a respective one of the plurality of second light sources and the light conductor for coupling the light of the plurality of second light sources into the light conductor directly through material of the optical coupling elements; and
      a control unit for separate activation of the at least one first light source and the plurality of second light sources,
      wherein each of the optical coupling elements at least partially surrounds the light conductor to contact both a respective lower area and a respective upper area of the light conductor to pass light directly through the material of the optical coupling element and into the respective lower area and the respective upper area, and wherein the control unit is designed for providing a functionality of a turn signal indicator in order to switch on the plurality of second light sources along the longitudinal extension direction of the light conductor in sequence, subsequently switch off the plurality of second light sources and, subsequently switch on the first light source; and wherein the lighting device is arranged in the headlights or taillights of the motor vehicle.

6. A method for operating a lighting device for a motor vehicle external light, the method comprising:

providing a light conductor, which extends along a longitudinal extension direction and has two end faces;

coupling light from at least one first light source into one of two end faces of the light conductor;

coupling light from a plurality of second light sources into the light conductor vertically with respect to the longitudinal extension direction of the light conductor, wherein a respective optical coupling element for coupling the light of the plurality of second light sources into the light conductor directly through material of the optical coupling element comprises a single, unitary structure is arranged between each of the plurality of second light sources and the light conductor, each optical coupling element at least partially surrounding the light conductor to contact both a respective lower area and a respective upper area of the light conductor to pass light directly through the material of the optical coupling element and into the respective lower area and the respective upper area;

separately activating the at least one first light source and the plurality of second light sources with a control unit; and providing a functionality of a directional turn signal by switching on in sequence the plurality of second light sources along the longitudinal extension direction of the light conductor, and subsequently switching off the plurality of second light sources, and then subsequently switching on the first light source.

7. A lighting device for a motor vehicle exterior light, comprising:

a light conductor, which extends along a longitudinal extension direction and has two end faces;

at least one first light source for coupling light into one of the two end faces of the light conductor;

a plurality of second light sources for coupling light into the light conductor along the longitudinal extension direction of the light conductor;

a plurality of optical coupling elements, each optical coupling element comprising a single, unitary structure arranged between a respective one of the plurality of second light sources and the light conductor for coupling the light of the plurality of second light sources into the light conductor directly through material of the optical coupling elements; and a control unit for separate activation of the at least one first light source and the plurality of second light sources, wherein each of the optical coupling elements has a lower leg and an upper leg that each extend past a rearmost portion of the light conductor to at least partially surround the light conductor and through which light directly passes during operation of the lighting device.

8. The lighting device according to claim 7, wherein the lower leg contacts a lower area of the light conductor and the upper leg contacts an upper area of the light conductor.

9. The lighting device according to 7, wherein the control unit is designed for providing a functionality of a turn signal indicator in order to switch on the plurality of second light sources along the longitudinal extension direction of the light conductor in sequence, subsequently switch off the plurality of second light sources and, subsequently switch on the first light source.

* * * * *